Figure 1:
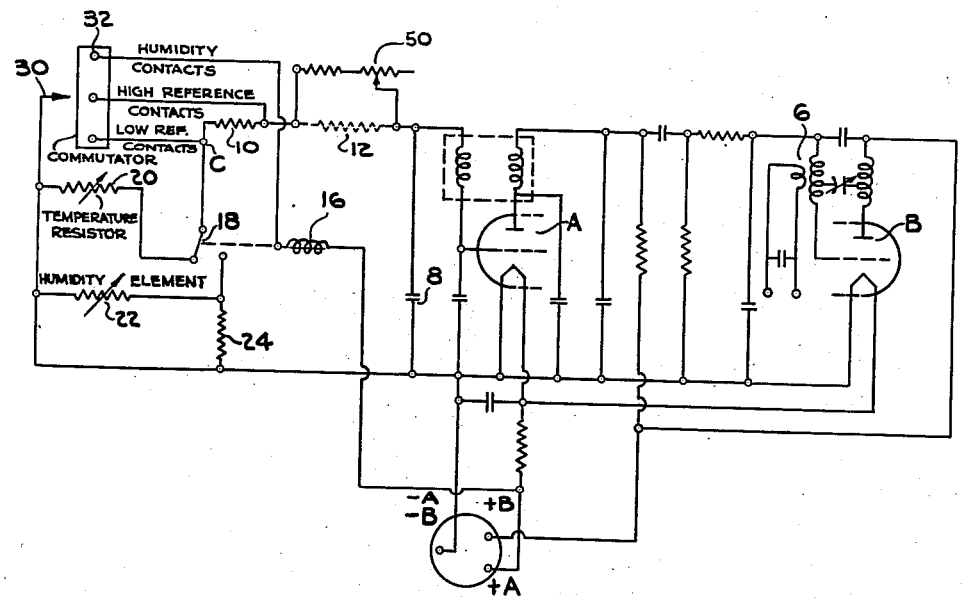

April 1, 1952     C. B. PEAR, JR     2,591,600
RADIOSONDE CALIBRATION METHOD
Filed Nov. 26, 1948     2 SHEETS—SHEET 1

INVENTOR.
CHARLES B. PEAR JR.
BY
Scrivener & Parker

April 1, 1952   C. B. PEAR, JR   2,591,600
RADIOSONDE CALIBRATION METHOD
Filed Nov. 26, 1948
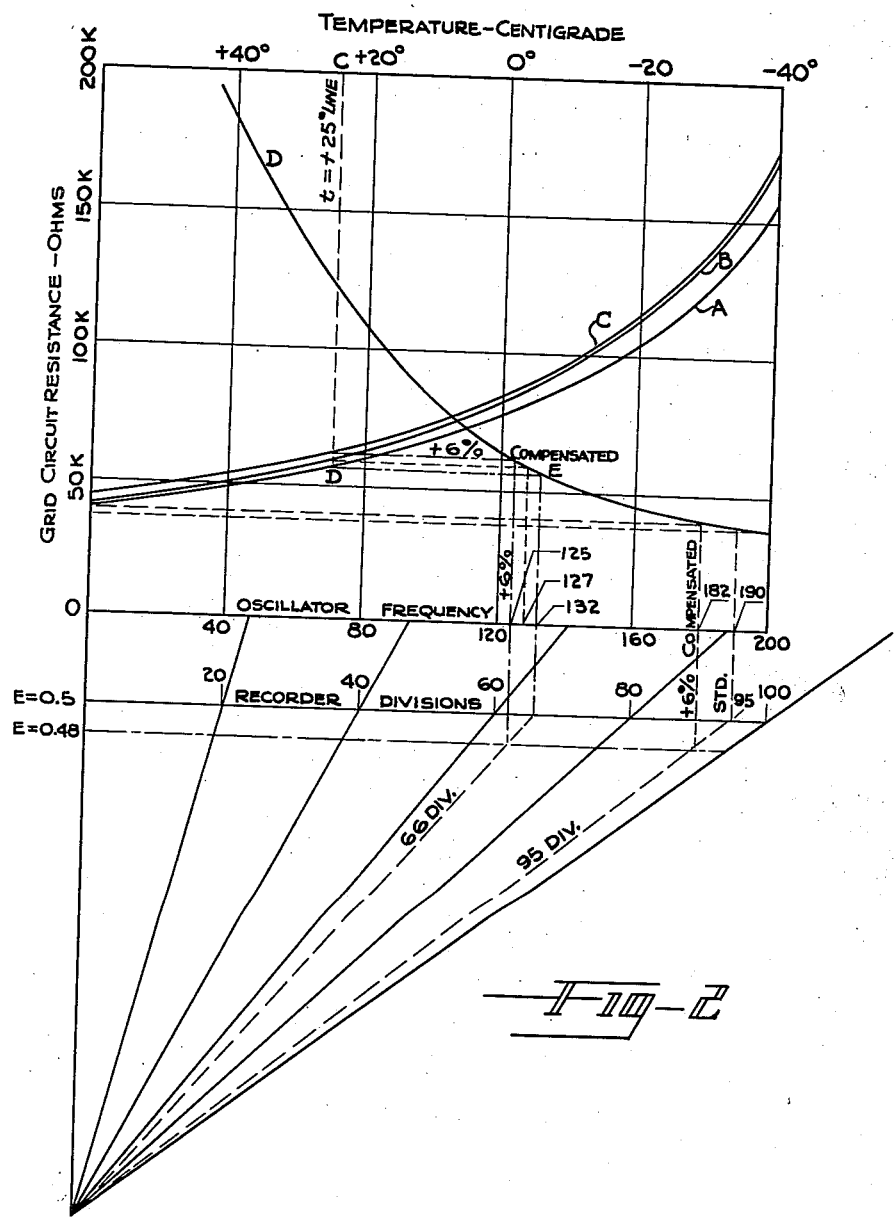
INVENTOR.
CHARLES B. PEAR JR.
BY
Scrivener & Parker Patented Apr. 1, 1952

2,591,600

UNITED STATES PATENT OFFICE 2,591,600

RADIOSONDE CALIBRATION METHOD

Charles B. Pear, Jr., College Park, Md., assignor to Washington Institute of Technology, Washington, D. C., a corporation of Delaware Application November 26, 1948, Serial No. 61,970

1 Claim. (Cl. 73—1)

This application is a continuation of my copending application Serial No. 599,729, filed June 15, 1945, now abandoned, for Radiosonde.

This invention relates broadly to the art of radiosonding, by which is meant the radiation, from a transmitter carried aloft by a balloon, of signals which are caused to vary in accordance with changes in atmospheric conditions such as humidity, temperature and pressure, the reception of such signals on the ground and the interpretation of such signals to determine atmospheric conditions at various altitudes. More particularly, the invention relates to radiosondes of the so-called Diamond-Hinman type which are described and claimed in United States Letters Patent No. 2,283,919, and to that part of such radiosondes which is responsive to changes in temperature and which is operable to affect the transmitted signal to cause the signal, when received, to be susceptible of interpretation to indicate the ambient temperature at the radiosonde.

The invention, its nature and objects, and how it is carried out, are described in this application by reference to the attached drawings in which Fig. 1 is a circuit diagram of a radiosonde transmitter embodying the invention, and Fig. 2 is a graphical representation of certain characteristics and relations of the transmitter of Fig. 1 and the temperature-sensitive and other resistors forming part thereof, and illustrating the operation of the invention.

In radiosondes of the type referred to, and to which this invention relates, an audio frequency modulation developed at the radiosonde is periodically varied in frequency in accordance with variations in the temperature of the air through which the radiosonde passes and this modulation frequency is impressed on a carrier radiated from the radiosonde. The frequency of the audio modulation is also varied, at different periods, by variations in the humidity of the air through which the radiosonde passes but as the invention is not concerned in any way with this part of the radiosonde no further description thereof will be given.

In use, such a radiosonde is one part of a telemetering system including the radiosonde and its antenna, a remotely located receiver with a similar antenna, and a frequency meter. The frequency meter in use with this equipment is a device including a current meter calibrated in a predetermined number of divisions (100 being the number now used) and having sufficient range to measure 200 cycles at a ratio of 2 cycles per recorder division, a translation device by which a signal produces a direct current proportional to the frequency being measured, a switch by which the range of meter current may be varied, thus varying the readable frequency range, and an adjusting means for slightly varying the meter current, so that with a setting of this adjusting means represented by E, the meter indication of D in relation to the frequency $f$ may be represented by $D=Ef$.

In Fig. 1 of the drawings there is disclosed the schematic circuit diagram of a radiosonde of the type to which the invention relates and which embodies my invention. In this diagram A is a relaxation oscillator of special type adapted from that described in British Patent No. 235,254 of June 11, 1925, for the special purpose of converting resistance variations into changes in the oscillation frequency. The grid of a carrier oscillator B is connected to the output circuit of the oscillator A and the carrier oscillator is connected to supply modulated carrier to an antenna through coupling 6. A capacitor 8 is connected in the grid circuit of the oscillator A and is connected in parallel with a series combination of resistors which includes fixed resistor 10 and either temperature resistor 20 or the parallel combination of humidity resistor 22 and fixed resistor 24.

In the operation of circuits as illustrated in Fig. 1 the capacitor 8 is negatively charged by the flow of grid current until the grid bias becomes so negative that plate current is stopped and oscillation ceases. The charge on capacitor 8 then flows off through a shunt resistance until the grid bias becomes small enough that oscillation begins, whereupon the described cycle is repeated. This shunt resistance consists, in known circuits, of the resistors 10, 12 and, in addition, either the temperature resistor 20 or the shunt combination of the humidity resistor 22 and a fixed resistor 24, and will therefore depend on the position of the contact 18 of relay 16. These combinations of resistors are placed in and out of the circuit by means of the operation of the pressure switch contact 30, which, in its movement across the commutator 32 sequentially grounds the humidity contacts, the high reference contacts and the low reference contacts. Normally the pressure switch contact 30 rests on an insulating segment of the commutator, in which case the relay 16 is not energized and the temperature resistor 20 is in circuit with the resistances 10 and 12 and therefore, with those two resistances, receives the charge flowing from capacitor 8. When the moving pressure switch contact rests on a humidity segment of the commutator the relay 16 is operated and the humidity resistance 22 is put in circuit with the resistances 10 and 12. When a low reference contact is grounded by the pressure switch contact the shunt resistance connected to capacitor 8 consists only of resistances 10 and 12, which remain constant during the flight of the radiosonde. There is thus provided a means for detecting any changes in the relaxation frequency produced by changes in the resistances of the resistors 20 and 22.

It will be seen from the foregoing that the relaxation frequency of the oscillator A is a function of the resistance connected in series with fixed resistors 10 and 12. This function is known as the audio frequency characteristic of the transmitter and is considered to be constant for any transmitter design. The function for a typical transmitter design is represented by curve D in Fig. 2. This curve is based on the design-center or "nominal" values currently in use for total resistance external to the grid of the modulating tube A of the transmitter, and takes the form of the relationship $f=KR^n$ in which if $f$ is the oscillator frequency of tube A, K is a constant, R is the grid-circuit resistance and $n$ is a constant real number. It is essential to the operation of radiosondes of the type to which this invention relates that the audio frequency characteristic of the transmitter be of this nature.

It is now standard practice to employ in radiosondes of the described type a device or element which varies in electrical resistance with variations in its temperature, in a known manner and at a known rate. This element, which will be referred to hereinafter as the temperature resistor is the resistor 20 of Fig. 1 and, in known and usual practice at this time, is formed of a semi-conducting ceramic material whose electrical resistance varies with its temperature and therefore with the ambient temperature. This variation in resistance is used to vary the relaxation frequency of oscillator A which, when radiated by carrier supplied by oscillator B, constitutes the intelligence received on the ground from which the ambient temperature at the radiosonde is determined. When curve A (or B or C) of Fig. 2, which represents the variation of resistance of a temperature-sensitive resistor with changes in temperature, is used in conjunction with curve D it is possible to interpret any received frequency in terms of the temperature at the radiosonde at the moment the received frequency was transmitted. Thus, the dotted line C—D—E illustrates the determination of a temperature of +25° when a frequency represented by 66 recorder divisions at the receiver is radiated by a radiosonde having a standard temperature-sensitive element.

In the ideal case all temperature resistors would have the same resistance at any given temperature but in practice it is not possible to manufacture such devices which are uniform in this manner. However, it is possible to manufacture temperature resistors which, at every temperature, vary in resistance by a constant percentage from a "standard" resistance at the same temperature. This percentage variation will be constant for a temperature resistor throughout the range of temperatures at which it is operative, this being illustrated logarithmically in Fig. 2 by the constant displacement of curve B from curve A.

In Fig. 2 the curve A represents the series combination of a fixed resistance element 10, a variable resistance element 50 (which is that introduced by this invention), and the temperature-sensitive resistance element 20. For the purpose of drawing curve A, the fixed resistance 10 has been taken as 41,000 ohms, the variable resistance 50 has been taken as 1,000 ohms and the temperature sensitive element 20 has been given the set of design-center or "nominal" values currently used in U. S. Weather Bureau radiosonde practice. The curve B represents the same combination, with the exception that the temperature sensitive element 20 has been arbitrarily assigned a set of values each of which is 6% higher in resistance than the "nominal" values in order to illustrate an instance of normal manufacturing variation resulting from the nature of temperature resistor production. The curve C represents the same combination as does curve B, with the exception that the variable resistance element 50 is no longer 1,000 ohms, but has been adjusted to have a value of approximately 3,000 ohms; the exact value being obtained by consulting the mathematical expression $$D_t = E_f\left\{M\left[P(t)+\frac{R'}{M}\right]\right\} \text{ with } \frac{R'}{M} \text{ constant}.$$

in which $D_t$ is the meter indication, $E_f$ is the setting of the adjusting means of the meter, M is the ratio of the non-standard temperature resistor to a standard temperature resistor, $P(t)$ is the resistance at temperature $t$ of a standard temperature resistor, R' is the resistance at temperature $t$ of the non-standard temperature resistor, and $$\frac{R'}{M}$$

is constant.

It might be assumed from the foregoing that a simple and obvious method of making an actual temperature resistor conform to a predetermined standard value would be to add in series with each such device sufficient resistance to bring the total resistance to the standard. This is impractical, however, for the reason that in radiosonde operation and use the ratio of resistance at temperature A to resistance at temperature B must be constant for all temperature resistors regardless of the fact that the absolute resistance at temperatures A and B will vary widely between different resistors. This may be illustrated by considering that if the resistance of the temperature-sensitive circuit is to be 4000 ohms at 30° C. and 2000 ohms at —30° C. the ratio 4:2 must be maintained at all temperatures. If it is found by test that the temperature resistor which is to be used has a resistance of 3000 ohms at 30° C. and 1500 ohms at —30° C. the addition of 1000 ohms will bring the total resistances at 30° C. and —30° C. to 4000 ohms and 2500 ohms, respectively, thus changing the ratio from 4:2 to 4:2.5. As stated above, this will render the circuit useless for radiosonde work as the ratio of 4:2 must be maintained.

It has heretofore been the practice to make adjustments for variations in the temperature resistors by means of an evaluation device comprising two relatively movable rulers, on which are respectively laid out the curves A and D, and which are moved relatively to each other in the manner of a slide rule in order to displace curve A sufficiently from its normal position to compensate for the variation of the resistor from the standard. The amount of such displacement is determined by operating the radiosonde at a place where the temperature may be maintained constant and measured, and recording the frequency transmitted. The evaluation device is then set so that the temperature indicated by the transmitted frequency agrees with that measured by independent means at the radiosonde. This procedure is known as the temperature lock-in and it is recognized that it may diminish errors due to variations in the transmitter, in the recorder or in the frequency meter, as well as those due to variations in the dimensions of the temperature resistor from a standard. For a further discussion of this correction procedure reference may be had to Bureau of Standards Research Paper RP1329 entitled "An Improved Radiosonde and Its Performance."

By the present invention I have provided a method and means for causing the frequency of oscillator A to correspond exactly to a predetermined frequency at any and all ambient temperatures which may act on the temperature resistor in the grid circuit of the oscillator, and for causing the low reference frequency of the oscillator to have a predetermined value. This is accomplished by first adding a variable resistor 50 to the grid circuit of the oscillator A in such an arrangement and manner that it will be in the grid circuit during low reference measurement and also will be in series with the temperature-sensitive resistor 20 when that resistor is in the grid circuit. In order to so arrange the variable resistor 50 I put it in the place of the fixed resistor 12 which has heretofore been provided. In addition to the addition of the resistor 50 my invention provides an adjustment which may best be disclosed by the description of an actual operation in accordance with the invention.

In such an operation the ground station operator, before releasing the radiosonde, exposes it to an ambient temperature which may be, for the purpose of this example, 25.0° C. It will be seen from Fig. 2 that if all resistance elements were standard (curve A) a resistance would be developed which would produce a frequency of 132 cycles per second. The standard low reference frequency, under the same conditions with the 41,000 ohm and the 1,000 ohm elements only, in circuit, would be 190 cycles per second. If the recorder scale be set to a certain expansion E (assigned the value 0.5, for the purpose of this diagram) the low reference will have a value of 95 recorder divisions, and the temperature signal will have a value of 66 recorder divisions. It is to be understood, for the purpose of this example, that these two values are the desired ones and will be accepted as "standard."

However, if the ground station operator uses a radiosonde whose temperature resistor is 6% higher in resistance (curve B), at all temperatures, than the design-center values (curve A), it will be seen on the chart that the resistance developed will produce a frequency of 127 cycles per second. Since the low reference frequency is unchanged (the temperature resistor is out of circuit when low reference is transmitted) at 190 cycles, and since the standard low reference recorder value is 95 recorder divisions, there has been no way in which the low reference value and the temperature signal can be made to have, simultaneously, their required values.

However, in accordance with the invention and by means of the variable resistance element 50, the curve B can be displaced away from curve A to become curve C. It will be seen that, at 25° C., curve C will produce a frequency of true value approximately 125 cycles per second. But since the displacement came about as the result of changing a resistance element which is in circuit when low reference is transmitted, a new true value of low reference 182 cycles approximately, is obtained.

It now becomes possible, by readjusting the scale expansion of the indicating recorder to a value $E=0.48$, to obtain an indicated low reference signal of 95 recorder divisions, and at the same time obtain an indicated temperature signal of 66 recorder divisions. This is shown graphically on the line labelled "$E=0.48$."

It will be seen that the variable resistance element introduced by this invention, far from returning the displaced curve B down to curve A, actually moved the curve further from A. The compensation comes about only because the variable resistance element, at the same time it displaced curve B up to become curve C, also moved the true value of low reference frequency down by a precise amount which enabled the operator to readjust his scale expansion and make both temperature and reference signals appear to be exactly on the desired standard points.

What is claimed is:

In a radiosonde comprising an audio oscillator, an adjustable scale indicator on which the output frequency appears as a function of the sum of a first grid circuit resistance and a temperature sensitive resistor, so arranged that the grid circuit may cause the first grid circuit resistance alone or may comprise the first grid circuit resistance plus the temperature sensitive resistor and where the temperature sensitive resistor departs from a predetermined standard temperature-resistance relation by a constant percentage of a standard resistance at every temperature, the method of calibrating the device to standard values of resistance at every temperature comprising the steps of obtaining an oscillator output frequency indication which constitutes a first reference point wherein the oscillator grid circuit comprises the first grid circuit resistance alone, adding sufficient resistance to the first grid circuit resistance so that the frequency output of the oscillator, which includes the temperature sensitive resistor, represents a true temperature as compared to a standard temperature-resistance curve for such resistors, obtaining an oscillator frequency output with the added resistance to the first grid resistance but not including the temperature sensitive resistor in the grid circuit, to obtain a second reference point on the indicator, and adjusting the indicator scale to make the scale value of the first reference point coincide with the second reference point.

CHARLES B. PEAR, Jr.

REFERENCES CITED

The following references are of record in the file of this patent:

UNITED STATES PATENTS

| Number | Name | Date |
|---|---|---|
| 1,951,276 | Edwards et al. | Mar. 13, 1934 |
| 2,210,903 | Dunmore | Aug. 13, 1940 |
| 2,287,786 | Diamond et al. | June 30, 1942 |
| 2,384,931 | Kessler | Sept. 18, 1945 |